United States Patent
Randell et al.

(10) Patent No.: US 6,221,532 B1
(45) Date of Patent: Apr. 24, 2001

(54) PAPER SEPARATORS FOR ELECTROCHEMICAL CELLS

(75) Inventors: Christopher Fred Randell, New Hall; Neal Charles White, Hexham, both of (GB)

(73) Assignee: Eveready Battery Company, Inc., St. Louis, MO (US)

(*) Notice: Subject to any disclaimer, the term of this patent is extended or adjusted under 35 U.S.C. 154(b) by 0 days.

(21) Appl. No.: 09/068,259

(22) PCT Filed: Nov. 8, 1996

(86) PCT No.: PCT/GB96/02739

§ 371 Date: Mar. 23, 1999

§ 102(e) Date: Mar. 23, 1999

(87) PCT Pub. No.: WO97/17735

PCT Pub. Date: May 15, 1997

(30) Foreign Application Priority Data

Nov. 8, 1995 (GB) .................................................. 9522864

(51) Int. Cl.$^7$ ....................................................... H01M 2/16
(52) U.S. Cl. ........................... 429/246; 429/247; 429/129; 429/145; 162/123
(58) Field of Search ..................................... 429/247, 246, 429/129, 145; 162/123

(56) References Cited

U.S. PATENT DOCUMENTS

| 3,892,591 | * | 7/1975 | Uetani et al. | .......................... 429/201 |
| 4,406,737 | * | 9/1983 | Latimer et al. | ...................... 162/111 |
| 5,900,182 | * | 5/1999 | Kanbara et al. | ..................... 252/62.2 |

* cited by examiner

*Primary Examiner*—Laura Weiner
(74) *Attorney, Agent, or Firm*—Robert W. Welsh

(57) ABSTRACT

Paper for use as a separator in an electrochemical cell completely absorbs a 50 µl drop of water placed thereon in a time of not less than four minutes and not greater than fifteen minutes at 20° C. and provides an improve cell having less leakage and corrosive, especially in a mercury-free cell.

8 Claims, No Drawings

PAPER SEPARATORS FOR ELECTROCHEMICAL CELLS

The present invention relates to types of paper useful in the manufacture of separators for electrochemical cells, especially zinc chloride cells.

The history of electrochemical cells goes back to 1866 when Leclanché first discovered the principle on which they are based. The manufacture and design of electrochemical cells has come a long way since that time, but problems still remain. Cells (also known as batteries, although the term technically relates to a series of cells) essentially consist of an anode, a cathode and an electrolyte. In the present day version of the Leclanché cell, the anode is zinc, the cathode is manganese dioxide and the electrolyte is an aqueous solution of varying proportions of zinc chloride and ammonium chloride. In other primary cells, the electrolyte is frequently an aqueous solution of potassium or sodium hydroxide. In any event, it is necessary to seal the various components into a can in order to prevent the possibly dangerous escape of the constituents, as well as to prevent the atmosphere from affecting the constituents.

The problem of leakage of the electrolyte and corrosion of the can (zinc in Leclanché cells) was very largely overcome by the addition of cadmium and mercury, but especially mercury, to the cell ingredients.

Thus, mercury was responsible for reducing perforation of the can during abuse conditions, reducing corrosion and preventing perforation during storage, and it also had the advantage that it assisted in discharge. However, now that mercury is viewed as a major environmental pollutant, there has been a very major push to develop cells with no added mercury and, to a lesser extent, cells with no added cadmium.

In seeking to overcome the problems associated with cells containing no added mercury, it is the electrolyte mix which has been targeted, and a number of different additives, such as arylsulphur compounds, fluoroalkylpolyoxyethylene ether compounds, alkyl polyoxyethylene ethers, alkyl polyoxyethylene phosphate ethers and tetraalkyl and alkyl ammonium compounds, have been tried, all with varying degrees of success. In addition, cell design has also played a large role, with there being a large number of different designs for the seal.

However, the design of the separator has largely been ignored. This is essentially because the purpose of the separator is to prevent contact between the materials used for the cathode and anode, whilst permitting ionic contact between the materials via the electrolyte which permeates the separator. As such, the criteria for the manufacture of a separator have always been rather loose, and conventional separators vary very widely, the only matter which they share in common being that they are made of porous paper and have a coating of starch and gellant to assist in absorption of the electrolyte.

We have now discovered that the type of paper used in the manufacture of the separator can have a very great impact on the properties of the cell in which it is used.

Our tests on a number of different papers which are currently used in the manufacture of separators have established that the type of paper used can make a very great difference to cell performance. Of the papers known in the prior art, that which is currently known as PBDE100 (as disclosed in U.S. Pat. No. 4,001,044) performs well in a variety of tests. However, this paper suffers a number of disadvantages, not least of which is expense.

PBDE100 is a duplex paper, insofar as it is manufactured by the combination of pulp from two sources. This makes PBDE100 expensive to manufacture, but it has a number of advantages, including: the ability to prevent mix penetration; low leakage in low drain continuous testing; high short circuit amperage; high continuous performance; and high performance retention. However, apart from the high cost of manufacture, this paper also suffers from high leakage in high drain continuous testing.

Accordingly, it is desired to find a paper with the advantages of PBDE100 and which is cheaper to manufacture or which has low leakage in the high drain continuous test, or both.

In a first aspect, the present invention provides paper for use as a separator in an electrochemical cell which, at room temperature (20° C.), completely absorbs a 50 $\mu$l drop of water placed thereon in a time of not less than four minutes, and not greater than fifteen minutes.

We have established that the rate of absorption of a drop of water under ambient conditions at room temperature is indicative of the performance of the paper as a separator. Currently, all of the papers used as separators, including PBDE100, absorb the droplet of water in less than four minutes. In fact, most currently used separator papers absorb water in a matter of seconds, while PBDE100 generally takes a little over three minutes.

In addition to the length of time that it takes to absorb the droplet of water, we also prefer that the paper wets virtually instantly (i.e. in less than 5 seconds), preferably in less than 1 second, from one side to the other when the droplet is placed upon it. Whilst this is not crucial, it is desirable, and provides an indication of the thickness of the paper, amongst other things. The paper thickness is not crucial to the present invention, but is merely guided in the same manner as for conventional cells. Paper which is too thin may not provide a good barrier to penetration of the mix, whilst paper which is too thick may obstruct ionic communication between the cathode and anode material, as well as taking up valuable space in the cell. For example, a commonly used paper is Enso 80 (Trademark), and this has a thickness of 160 $\mu$m, and is the thickest paper currently used on a regular basis.

The method of manufacture of the paper has some considerable effect on the properties of the paper. As stated above, PBDE100 is manufactured by bringing together pulp from two different vats, so as to provide a duplex paper.

While this method tends to produce a quality paper, it is costly and complex

Most papers used in conventional separators are actually from a single source of pulp. These papers are considerably cheaper to manufacture, but perform poorly in a number of tests. However, we have established that it is possible to produce papers from a single source of pulp which perform well in all tests, and such papers are characterised by their ability, at a temperature of about 20° C., to absorb a 50 $\mu$l droplet of water in a period of between four and fifteen minutes. More preferably, this period is between five and fifteen minutes and is particularly preferably between five and ten minutes.

If the paper absorbs the droplet of water in less than four minutes, then the density of the paper tends to be too low, and poor results are obtained in the tests (which are outlined below). If the paper absorbs the droplet in greater than fifteen minutes, then this causes practical problems during manufacture, as the individual cells need to be voltage tested soon after assembly, and the delay in absorbing the electrolyte from the mix would mean that there would be an unacceptable storage time before the cells could be tested.

The characteristics of the papers which have the necessary absorption tend to be those of high beat and high density. Beating is performed on the pulp prior to formation of the paper, and the degree of beating can be measured by the use of the "Canadian standard freeness tester". The test is T 227m-58 of the Technical Association of the Paper and Pulp Industry and is described, for example, in "A Laboratory Handbook of Pulp and Paper Manufacture (Auth. J. Grant, Pub. Edward Arnold, 2nd Ed. 1961, pp.154 et seq.).

Conventional papers, such as Enso 80 (supra) have a density typically in the region of 0.5 g/cm$^3$, and even PBDE100 only has a density of 0.62 g/cm$^3$.

The single pulp source papers which are preferred for the present invention have densities typically of 0.64 g/cm$^3$ and above, with preferred densities being between about 0.65 and about 1 g/cm$^3$, and more preferred densities being between about 0.65 and about 0.9 g/cm$^3$, although there tends to be very little to choose in this particular range of densities. For example, one particularly preferred paper of the present invention is made by Cordier (product code COK~70) and has a density of 0.64 g/cm$^3$, and another particularly preferred paper of the present invention is made by Munksjö (product code 114440) and has a density of 0.76 g/cm$^3$ A list of some of the preferred papers useful in the present invention is as follows:

| | |
|---|---|
| Cordier | COK~60 |
| Cordier | COK~70 |
| Sibille Dalle | 58060 (hereafter "SDMF") |
| Munksjö | 114440 |
| Munksjö | 114770 |
| Tervakoski Oy | Tertrans N75 0,75 |
| Tervakosko Oy | Terkab E70 10 |

The Cordier papers are available from Papierfabrik Cordier GmbH, Pfalz, Germany; the Sibille Dalle papers are available from Sibille Dalle, Vitry sur Seine, France; the Munksjö papers are available from Munksjö Paper AB, Jönkpöng, Sweden; and the Tervakosko papers are available from Oy, Tervakoski, Finland.

Papers having a density of less than about 0.6 g/cm$^3$ tend to yield poor results in the tests, whilst papers with densities in excess of about 1.0 g/cm$^3$ tend to exceed the 15 minute limit in the water droplet absorption test.

The papers of the present invention may suitably be treated in any conventional manner to provide a separator for an electrochemical cell. Accordingly, the present invention further provides a separator for an electrochemical cell comprising a paper of the invention.

Typical cells in which the separators of the present invention can be used include primary and secondary zinc carbon cells, including those cells known as Leclanché and zinc chloride cells. The electrolyte in such cells is typically as follows: Leclanché electrolyte—5–20% zinc chloride, 30–40% ammonium chloride, remainder water; zinc chloride electrolyte—15–35% zinc chloride, 0–10% ammonium chloride, the remainder water. Some other suitable cells for use in the present invention are described in Chapter 5 of the Handbook of Batteries and Fuel Cells (edited by David Linden, published by McGraw Hill).

Cells may have any suitable configuration, such as round, square or flat. Thus, in addition to the aspects described above, the present invention also provides an electrochemical cell comprising a separator of the invention.

Two of the following tests have not previously been published. We have termed these tests the High Drain Continuous Test (HDCT) and the Low Drain Continuous Test (LDCT). The High Drain Continuous Test is intended to simulate abuse conditions, such as might be found in leaving a flashlight in the "on" condition over a period of time, even after the battery had, to the user, gone "flat". The Low Drain Continuous Test simulates the conditions experienced by a battery in, for example, a clock. HDCT results are measured in terms of the amount of leakage, whilst LDCT results are measured in terms of failure of the battery due to perforation or splitting of the can. These tests produce highly informative results in considerably less time than would otherwise be experienced in the conditions being simulated. Results are generally available in around 4 and 10 weeks respectively, although it will be appreciated that the amount of time required will depend on such factors as the cell which is to be tested and the extent to which it is desired to test the cell, for example.

The Low Drain Continuous Test for an electrochemical cell is characterised in that the can is sealed but left uncovered, a high resistance is secured between the poles of the cell so as to complete a circuit, and the cell is monitored as to its condition.

It will be understood that, in this test, monitoring the cell is intended to ascertain whether the cell fails during testing. The typical lifetime of a D-size zinc carbon cell is up to about 10 weeks when the resistance is about 300 Ω. Other resistances may be used as appropriate, although 300 Ω provides useful results. An appropriate resistance for a C-size cell is about 500 Ω while, for an AA-size cell it is about 810 Ω. The omission of the bottom cover and the over tube is to expose the can to a surrounding atmosphere, thereby enhancing any failure that might occur, which is one reason why this test can be performed in 10 weeks, when it might take 2 years in a clock, for example.

The High Drain Continuous Test for an electrochemical cell is characterised by the cell being preferably fitted with a bottom cover, a low resistance being secured between the top cover and a point on the can wall proximal to the top cover and, thereafter, sliding an overtube onto the can so as to cover substantially as much of the can as possible without dislodging the resistance, weighing the resulting assembly, storing the cell at ambient temperature, preferably 20° C., weighing the cell at intervals during storage if desired, and determining the amount of electrolyte lost during storage by weighing to establish leakage. This last weighing may be effected by removing and weighing the over tube after storage or weighing the cell without the over tube but with the resistance, or both. Addition of the bottom cover during this test is particularly advantageous in preventing corrosion at the bottom of the can during the test.

A suitable resistance for this test for a D-size cell is 3.9 Ω and about 5 Ω for an AA-size cell, and the test is typically carried out for 4 weeks, testing at weekly intervals. The normal discharge life for a D cell is about 6 hours in this test until the cell becomes useless. Testing for 4 weeks, for example, establishes how the cell stands up to abuse conditions.

The present invention will now be illustrated with respect to the accompanying, non-limiting Examples wherein percentages are by weight, unless otherwise specified. The Test Examples are preceded by certain Test Protocols appropriate to the Test Examples and which are not known in the art. Unless otherwise stated, the zinc cans used in the present examples typically comprise 0.4% lead and 0.03% manganese and have a wall thickness of 0.46±0.03 mm. The mix for the cathode typically comprises 52% manganese dioxide (comprising 50% electrolytic $MnO_2$ and 50% natural $MnO_2$), 0.4% zinc oxide, 6% acetylene black and 41.6% zinc chloride solution (26.5% zinc chloride w/v). Otherwise, cells are generally manufactured in accordance with EP-A-303737.

For convenience, certain papers manufactured by Sibille Dalle are referred to herein simply by the prefix "SD" and a manufacturers product code, such as "SDMF" and "SDWS64".

The abbreviations used in the Examples are as follows, and all relate to the accepted IEC (International Electrotechnical Committee) standards and the protocols used are as defined by the IEC, unless otherwise specified:

| | |
|---|---|
| DG | IEC Radio Test |
| DP | IEC LIF Test |
| DM | IEC Motor Test |
| DT | IEC Toy Test |
| DY | IEC Continuous Toy Test |
| PI | Performance Index |

The performance index is calculated as the mean of the ratios obtained by measuring the discharge life of a cell in a given set of tests and dividing by the expected life. PI is expressed as a percentage.

Test Protocols

Preparation of Separators

The first step in the preparation of a separator is to prepare the paste to be used for the coating of the paper. The formulations used in the present Examples were as follows:

| | |
|---|---|
| Water | 64.3% |
| Organic Additive (Crodamet C20) | 0.5% |
| Gellant (Tylose MH200K, unless otherwise given) | 3.1% |
| Starch (Vulca 90) | 32.1% |

Suitable organic additives are commonly available as surfactants, typically as provided in "Industrial Surfactants Electronic Handbook" (published by Gower and edited by Michael and Irene Ash).

The following method was employed for making up the paste:

1. Add the organic additive and gellant to water and mix, using a high shear mixer, such as a Silversen type mixer (Silversen Machine Mixer Emulsifier Model L2R, UK); and 2. Place the resulting mixture in a paddle mixer, such as a Hobart mixer, add the starch, and mix until a smooth paste is obtained.

The separator paste is then coated onto the chosen paper. The technique used in the Examples is to run the coated paper between two rollers set apart by a predetermined distance in order to provide the desired coating weight when dry. The rollers are suitably set so that they run in opposite directions, with the forward roller running fastest. A suitable coating machine is made by Dixons (Dixons Pilot Coating Machine Model 160, UK).

The dry coating weight is measured in $gm^{-2}$ (gsm). Suitable gsm are 40 (for D cells), 30 (for C cells) and 20 (for AA cells).

The coated paper in the Examples is then dried either by oven-drying at 100–140° C. and/or by steam drum-drying at 100–150° C.

HDCT (High Drain Continuous Test)

1. Cell is manufactured as above. The bottom cover is added but no overtube.

2. 3.9 Ω resistors are soldered between a position on the side and the top cover of the battery. Cells are weighed ($w_1$)

3. Overtubes are weighed ($w_2$)

4. The overtube is pushed on cell but NOT spun in. The cell is weighed ($w_3$).

5. The HDCT cells are stored at 20° C. for 4 weeks. The normal discharge life for a D size cell on a 3.9 Ω test is ~6 hours. 4 weeks represents an abuse test to simulate a consumer leaving equipment switched on.

6. At weekly intervals (1 week, 2 weeks, 3 weeks & 4 weeks) ¼ of the original cells are removed and measurements are taken. The complete discharged cell is weighed ($w_4$).

7. The overtube is removed and weighed ($w_5$).

8. The resulting cell with soldered resistor still intact is weighed ($w_6$).

9. The HDCT leakage is $w_1 - w_6$.

LDCT (Low Drain Continuous Test)

1. Cell is manufactured as above. For LDCT NO bottom cover is added and NO overtube.

2. 300 Ω resistors are soldered between the side and the top cover of the battery.

3. Cells are monitored at weekly intervals up to 10 weeks. This would be the normal lifetime for a D cell on a 300 Ω test. This test is a simulation of a cell being used on a long duration test such as a clock.

4. A failure is when perforation or splitting of the can is observed. This would allow $O_2$ into the cell causing premature failure when on a long duration test.

SCA Test

The cell is shorted and the current passed is measured on a zero (very low) impedance meter. The resulting measurement is the SCA (Short Circuit Current) of the cell.

IEC Discharge Performance Tests

These are Industrial Standard tests which are measured on Fresh cells (1–2 weeks at 20° C.) and Aged cells (13 weeks@45° C. and 50% relative humidity).

Gassing Test

Cells are not fitted with a sealant or closure, allowing gas generated in the cell to escape. Cells are sealed in a glass container fitted with a stopper and a glass tube. The containers are immersed in a water bath at the required temperature. The open end of the glass tube is placed in a water bath and a water-filled graduated gas tube is positioned to collect any gas from the tube. The volume of gas generated is measured over 30 days.

EXAMPLE 1

Various papers were tested with the coating described in the above protocol, using the droplet test. The results are shown in Table 1.

TABLE 1

| Manufacturer | Paper | Coating weight g/m² | Thickness of uncoated paper μm | Density of uncoated paper g/cm³ | Droplet Test seconds |
|---|---|---|---|---|---|
| Enso | Enso 80 | 80 | 160 | 0.50 | 25 |
| Amatfors | Amatfors 57 | 57 | 110 | 0.52 | 50 |
| NKK | PBDE70 | 45 | 79 | 0.57 | 195 |
| NKK | PBDE 100 ld* | 68 | 110 | 0.62 | 100 |
| NKK | PBDE 100 hd* | | | | 220 |
| Sibille Dalle | SDWS64 | 64 | 100 | 0.64 | 48 |
| Cordier | COK ~ 60 | 60 | 90 | 0.67 | 282 |
| Cordier | COK ~ 70 | 70 | 110 | 0.64 | 548 |
| Sibille Dalle | 58060 (SDMF) | 60 | 80 | 0.75 | 498 |
| Munksjö | 114440 | 80 | 105 | 0.76 | 528 |

TABLE 1-continued

| Manu-facturer | Paper | Coating weight g/m² | Thickness of uncoated paper μm | Density of uncoated paper g/cm³ | Droplet Test seconds |
|---|---|---|---|---|---|
| Munksjö | 114770 | 80 | 100 | 0.80 | 736 |
| Terva-koski Oy | Tertrans N75 0,75 | 58 | 72 | 0.81 | 1492 |
| Packing sales | # | 65 | 77 | 0.84 | 580 |
| Terva-kosko Oy | Terkab E70 10 | 69 | 72 | 0.96 | 709 |
| Terva-koski Oy | Tertrans N50 1,12 | 56 | 49 | 1.14 | >1800 |

*-ld = low density side of the paper
hd = high density side of the paper
# = 65° Electronic Board
Th = thickness It can be seen that the papers starting with Cordier COK~60 fulfil the requirements of the present invention, having an absorption time of 240 seconds, or greater. The final paper of the Table has too high a density (>1800 seconds).

EXAMPLE 2

In the following Table 2, various papers are compared in the LDCT and HDCT tests.

TABLE 2

| Paper | g H₂O/Ah | 4 weeks HDCT (g) 0% NH₄Cl 2.2 | ~2.4 | 7 weeks LDCT |
|---|---|---|---|---|
| SD WS64 | | 0.7 | 0.5 | 10% |
| Enso 80 | | 1.7 | 0.8 | 16% |
| COK ~ 70 | | 1.0 | 0.5 | 5% |
| SD MF | | 1.5 | 1.0 | 5% |
| PBDE100 | | 2.8 | 1.4 | 5% |

It can be seen that only the papers of the invention (Cordier COK~70 and SDMF) perform consistently well in both of these tests.

EXAMPLE 3

In the following Table 3, various papers are compared in IEC standard tests, and it can be seen that COK~70 performs equally as well as PBDE100 in several tests, while outperforming it in others, thereby demonstrating that it possible to provide a relatively cheap simplex paper which can perform to the highest required degrees.

TABLE 3

| | | | | Fresh Performance | | | | | | | | 13w/45C Performance | | | | | | | | |
|---|---|---|---|---|---|---|---|---|---|---|---|---|---|---|---|---|---|---|---|---|
| | | | Targets | | | | | | | | | | | | | | | | | |
| | No. | H₂O/Ah | ZnCl₂/H₂O | SCA | 48 DG | 8.5 DP | 18.3 DM | 9.5 DT | 6.5 DY | PI | SCA | 48 DG | 8.5 DP | 18.3 DM | 9.5 DT | 6.5 DY | PI | Ret | CM |
| SD WS64 | 5 | ~2.4 | 0.30 | 6.7 | 46 | 7.8 | 15.3 | 8.0 | 5.9 | 89% | 4.1 | 44 | 4.0 | 13.9 | 7.0 | 5.2 | 74% | 83% | 61% |
| Enso 80 | 10 | ~2.4 | 0.30 | 6.9 | 46 | 8.5 | 15.4 | 8.1 | 6.1 | 92% | 4.6 | 44 | 5.8 | 14.4 | 7.5 | 5.3 | 80% | 87% | 66% |
| COK ~ 70 | 2 | ~2.4 | 0.30 | 8.3 | 46 | 8.0 | 14.7 | 7.6 | 6.4 | 90% | 5.4 | 43 | 5.7 | 14.1 | 7.4 | 5.9 | 80% | 89% | 64% |
| PBDE-100 | 5 | ~2.4 | 0.30 | 7.5 | 45 | 8.5 | 14.7 | 8.0 | 6.7 | 92% | 5.5 | 42 | 6.5 | 13.7 | 7.3 | 6.0 | 82% | 88% | 73% |

TABLE 4

| | Comparison of papers | | | | | | | | | |
|---|---|---|---|---|---|---|---|---|---|---|
| Paper | % EMD | H₂O/Ah | ZnCl₂/H₂O | MIX COST | No. of groups** | DG | DP | DM | DT | DY | PI |
| Enso 80* 2.3 g H₂O/Ah | 50% | 2.2 | 0.34 | 100% | 7 | 46.0 | 8.2 | 15.1 | 7.7 | 5.6 | 88% |
| Enso 80 | 50% | 2.3 | 0.30 | 97% | 3 | 45.8 | 7.5 | 15.6 | 7.9 | 5.5 | 87% |
| SD WS64 | 50% | 2.3 | 0.30 | 97% | 3 | 46.5 | 7.2 | 15.9 | 7.8 | 5.6 | 87% |
| PBDE100 | 50% | 2.3 | 0.30 | 97% | 3 | 46.0 | 8.2 | 15.6 | 8.1 | 6.1 | 91% |
| COK ~ 70 | 50% | 2.3 | 0.30 | 97% | 3 | 46.2 | 8.2 | 15.5 | 8.1 | 5.9 | 91% |
| SD MF 2.4 g H₂O/Ah | 50% | 2.3 | 0.30 | 97% | 3 | 46.3 | 7.9 | 15.4 | 7.9 | 6.0 | 90% |
| Enso 80 | 50% | 2.4 | 0.30 | 95% | 13 | 46.1 | 8.4 | 15.6 | 8.2 | 6.0 | 92% |
| SD WS64 | 50% | 2.4 | 0.30 | 95% | 4 | 47.2 | 8.6 | 15.7 | 8.4 | 6.1 | 93% |
| PBDE100 | 50% | 2.4 | 0.30 | 95% | 6 | 46.2 | 8.6 | 15.0 | 8.3 | 6.6 | 94% |
| COK ~ 70 | 50% | 2.4 | 0.30 | 95% | 6 | 46.8 | 8.9 | 15.8 | 8.5 | 6.5 | 96% |
| SD MF | 50% | 2.4 | 0.30 | 95% | 3 | 47.0 | 8.6 | 15.9 | 8.9 | 6.5 | 96% |

*this separator was tested with a Cleargel (trade mark)/Instant Pureflo (trade mark) gellant as a control.
**the results from these groups were averaged to give the results reported.

EXAMPLE 5

Test batteries were made as described above, but employing the following coating paste formulation on the papers shown in Table 5:

| | |
|---|---|
| Water | 60.63% |
| Organic Additive (Crodamet C20) | 0.57% |
| Gellant (Courtaulds 1209) | 3.29% |
| ISP PVP K120 | 0.87% |
| Starch (Vulca 90) | 34.64% |

The starch and gellant were pre-mixed dry before being mixed with the other components.

The resulting batteries were then subjected to the tests described above and the results are shown in Table 5.

TABLE 5

| Paper | Fresh | DY 13 weeks/ 45° C. | Retention | 4 weeks HDCT | 7 weeks LDCT |
|---|---|---|---|---|---|
| Enso 80 | 5.7 h | 4.4 h | 77% | 0.3 g | 10% |
| Munksjö 114440 | 6.4 h | 5.5 h | 86% | 0.1 g | 0% |

What is claimed is:

1. A zinc carbon electrochemical cell comprising a separator, wherein the separator comprises a paper which, at 20° C., completely absorbs a 50 $\mu$l drop of water placed thereon in a time of not less than four minutes and not greater than fifteen minutes, and in which the paper wets in less than five seconds from one side to the other when the droplet is placed upon it.

2. A cell according to claim 1, in which said time is from 5 to 15 minutes.

3. A cell according to claim 1, in which said time is from 5 to 10 minutes.

4. A cell according to claim 1, in which the paper wets in less than 1 second from one side to the other when the droplet is placed upon it.

5. A cell according to claim 1, in which the paper is a single pulp source paper.

6. A cell according to claim 1, in which the paper has a density of at least 0.64 g/cm$^3$.

7. A cell according to claim 6, in which said density is from about 0.65 to about 1 g/cm$^3$.

8. A cell according to claim 7, in which said density is from about 0.65 to about 0.9 g/cm$^3$.

* * * * *